(12) United States Patent
Von Novak et al.

(10) Patent No.: US 9,154,189 B2
(45) Date of Patent: Oct. 6, 2015

(54) WIRELESS POWER SYSTEM WITH CAPACITIVE PROXIMITY SENSING

(71) Applicant: QUALCOMM Incorporated, San Diego, CA (US)

(72) Inventors: William H Von Novak, San Diego, CA (US); Pavel Monat, San Diego, CA (US); Edward Kallal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 498 days.

(21) Appl. No.: 13/649,843

(22) Filed: Oct. 11, 2012

(65) Prior Publication Data

US 2014/0049422 A1 Feb. 20, 2014

Related U.S. Application Data

(60) Provisional application No. 61/684,626, filed on Aug. 17, 2012.

(51) Int. Cl.
| | |
|---|---|
| *H04B 5/00* | (2006.01) |
| *H02J 5/00* | (2006.01) |
| *H02J 7/02* | (2006.01) |
| *H01F 27/42* | (2006.01) |
| *H02J 17/00* | (2006.01) |

(52) U.S. Cl.
CPC .............. *H04B 5/0012* (2013.01); *H02J 5/005* (2013.01); *H02J 7/025* (2013.01); *H04B 5/0037* (2013.01); *H02J 17/00* (2013.01)

(58) Field of Classification Search
USPC ........................................................ 307/104
See application file for complete search history.

(56) References Cited

U.S. PATENT DOCUMENTS

| | | | |
|---|---|---|---|
| 8,487,478 B2 * | 7/2013 | Kirby et al. ................... 307/104 |
| 2005/0099278 A1 | 5/2005 | Kawaura et al. |
| 2008/0197712 A1 | 8/2008 | Jin et al. |
| 2010/0171368 A1 | 7/2010 | Schatz et al. |
| 2011/0006613 A1 | 1/2011 | Stevens et al. |
| 2011/0084807 A1 | 4/2011 | Logan et al. |

(Continued)

FOREIGN PATENT DOCUMENTS

| | | |
|---|---|---|
| FR | 2968616 A1 | 6/2012 |
| WO | WO-2009081115 A1 | 7/2009 |
| WO | 2012004092 A2 | 1/2012 |

OTHER PUBLICATIONS

International Search Report and Written Opinion—PCT/US2013/053832—ISA/EPO—Feb. 25, 2014.

(Continued)

*Primary Examiner* — Robert Deberadinis
(74) *Attorney, Agent, or Firm* — Knobbe, Martens, Olson & Bear LLP

(57) ABSTRACT

This disclosure provides systems, methods and apparatus for tuning a transmit coil for operation in a plurality of frequency bands. In one aspect, a method of wireless power transmission is provided. The method includes exciting a first part of a wireless power transmission system, via a wireless power transmitter. The method further includes detecting, in the presence of a non-charging object, a first change in a first parameter. The first parameter is indicative of a coupling between the non-charging object and the first part. The method further includes varying a characteristic of the wireless power transmission based on said first change.

87 Claims, 10 Drawing Sheets

(56) References Cited

U.S. PATENT DOCUMENTS

2012/0001493 A1   1/2012   Kudo et al.
2012/0153894 A1   6/2012   Widmer
2013/0181724 A1   7/2013   Teggatz et al.

OTHER PUBLICATIONS

Partial International Search Report—PCT/US2013/053832—ISA/EPO—Nov. 29, 2013.

* cited by examiner

WIRELESS POWER SYSTEM WITH CAPACITIVE PROXIMITY SENSING

CROSS-REFERENCE TO RELATED APPLICATIONS

This application claims priority under 35 U.S.C. §119(e) to U.S. Provisional App. No. 61/684,626, filed Aug. 17, 2012, which is incorporated by reference herein in its entirety.

FIELD

The present invention relates generally to wireless power. More specifically, the disclosure is directed to wireless power systems capable of capacitive proximity sensing.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a method of wireless power transmission. The method includes exciting a first part of a wireless power transmission system, via a wireless power transmitter. The method further includes detecting, in the presence of a non-charging object, a first change in a first parameter. The first parameter is indicative of a coupling between the non-charging object and the first part. The method further includes varying a characteristic of the wireless power transmission based on said first change.

Another aspect of the subject matter described in the disclosure provides a method of determining a distance of an object from a transmit antenna. The method includes exciting, via the transmit antenna, a first and second part of a wireless power transmission system. The second part is displaced from the first part. The method further includes detecting, in the presence of a non-charging object, a first change in a first parameter. The first parameter is indicative of a coupling between the non-charging object and the first part. The method further includes detecting, in the presence of the non-charging object, a second change in a second parameter. The second parameter is indicative of a coupling between the non-charging object and the second part. The method further includes comparing said first and second changes to determine a location of said object.

Another aspect of the subject matter described in the disclosure provides a system configured to provide wireless power transmission. The system includes a first metal plate and a transmit antenna. The transmit antenna is configured to provide wireless power and to excite the first metal plate. The system further includes a circuit configured to detect a first change in capacitance between said transmit antenna and said first metal plate. In an embodiment, the system can include a controller configured to vary a characteristic of the wireless power transmission based on the detected first change.

Another aspect of the subject matter described in the disclosure provides a system for determining a location of a foreign object in a vicinity of a wireless charging system. The system includes a first metal plate and a second metal plate displaced from the first metal plate. The system further includes a transmit antenna configured to provide wireless power and to excite the first and second metal plates. The system further includes a circuit configured to detect a first change in capacitance between said transmit antenna and said first metal plate. The system further includes a circuit configured to detect a second change in capacitance between said transmit antenna and said second metal plate. The system further includes a circuit configured to compare said first change to said second change to determine the location of said foreign object. In an embodiment, the system can include a controller configured to vary a characteristic of the wireless power transmission based on the determined location of said object.

Another aspect of the subject matter described in the disclosure provides an apparatus for wireless power transmission. The apparatus includes means for transmitting wireless power and for exciting a first part of a wireless power transmission system. The apparatus further includes means for detecting, in the presence of a non-charging object, a first change in a first parameter. The first parameter is indicative of a coupling between the non-charging object and the first part. The apparatus further includes means for varying a characteristic of the wireless power transmission based on said first change.

Another aspect of the subject matter described in the disclosure provides an apparatus for determining a distance of an object from a transmit antenna. The apparatus includes means for transmitting wireless power and for exciting a first and second part of a wireless power transmission system. The second part is displaced from the first part. The apparatus further includes means for detecting, in the presence of a non-charging object, a first change in a first parameter. The first parameter is indicative of a coupling between the non-charging object and the first part. The apparatus further includes means for detecting, in the presence of the non-charging object, a second change in a second parameter. The second parameter is indicative of a coupling between the non-charging object and the second part. The apparatus further includes means for comparing said first and second changes to determine a location of said object.

Another aspect of the subject matter described in the disclosure provides a non-transitory computer-readable medium including code. The medium includes code that, when executed, causes an apparatus to excite a first part of a wireless power transmission system via a wireless power transmitter. The medium further includes code that, when executed, causes the apparatus to detect, in the presence of a non-charging object, a first change in a first parameter. The first parameter is indicative of a coupling between the non-charging object and the first part. The medium further includes code that, when executed, causes the apparatus to vary a characteristic of the wireless power transmission based on said first change.

Another aspect of the subject matter described in the disclosure provides a non-transitory computer-readable medium. The medium includes code that, when executed, causes an apparatus to excite, via a transmit antenna, a first and second part of a wireless power transmission system. The second part is displaced from the first part. The medium further includes code that, when executed, causes the apparatus to detect, in the presence of a non-charging object, a first change in a first parameter. The first parameter is indicative of a coupling between the non-charging object and the first part. The medium further includes code that, when executed, causes the apparatus to detect, in the presence of the non-charging object, a second change in a second parameter. The second parameter is indicative of a coupling between the non-charging object and the second part. The medium further includes code that, when executed, causes the apparatus to compare said first and second changes to determine a location of said object.

Figure 1:
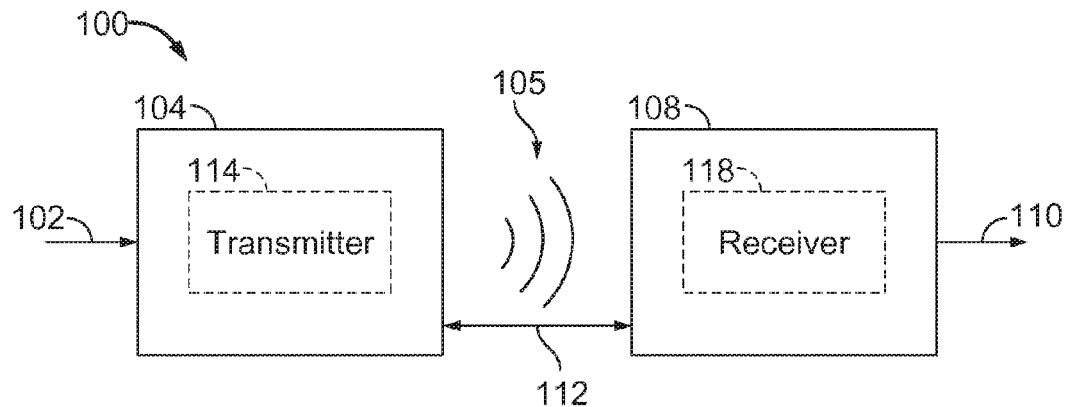
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 105 of the transmit coil 114 to a receive coil 118 rather than propagating most of the energy in an electromagnetic wave to the far field. When positioned within the field 105, a "coupling mode" may be developed between the transmit coil 114 and the receive coil 118. The area around the transmit and receive coils 114 and 118 where this coupling may occur is referred to herein as a coupling-mode region.

Figure 2:
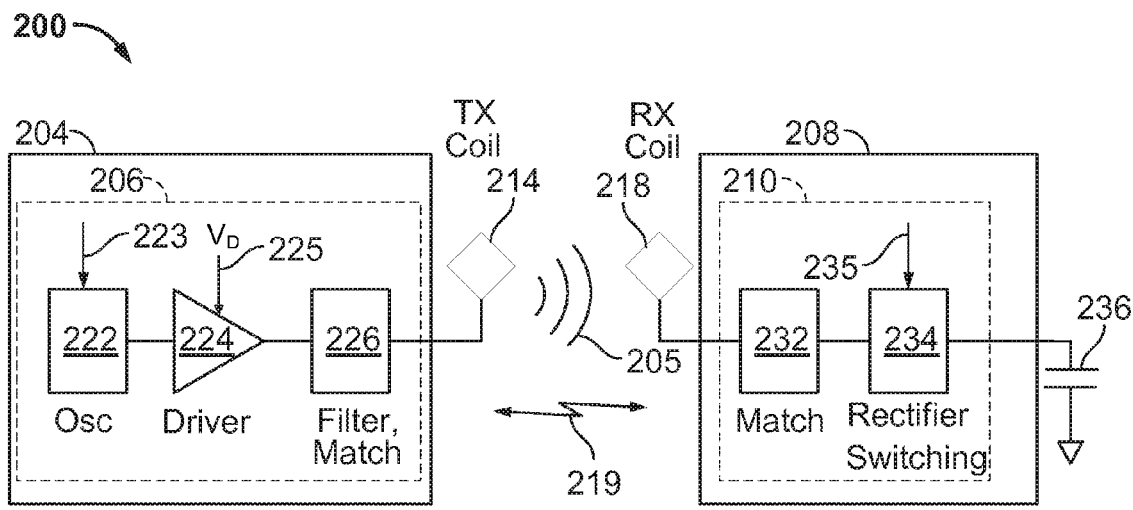
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit coil 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have a selectively disableable associated load (e.g., battery 236), may be configured to determine whether an amount of power transmitted by transmitter 204 and receiver by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
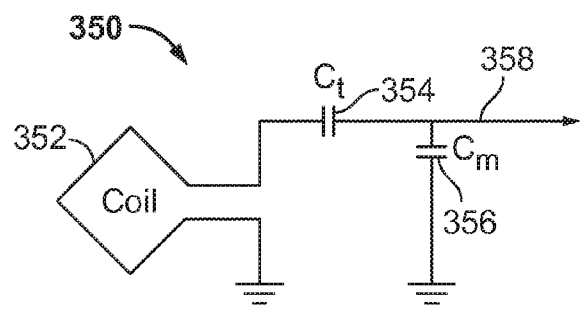
FIG. 3 is a schematic diagram of a portion of transmit circuitry or receive circuitry of FIG. 2 including a transmit or receive coil, in accordance with exemplary embodiments of the invention.

FIG. 3 is a schematic diagram of a portion of transmit circuitry 206 or receive circuitry 210 of FIG. 2 including a transmit or receive coil 352, in accordance with exemplary embodiments of the invention. As illustrated in FIG. 3, transmit or receive circuitry 350 used in exemplary embodiments may include a coil 352. The coil may also be referred to or be configured as a "loop" antenna 352. The coil 352 may also be referred to herein or be configured as a "magnetic" antenna or an induction coil. The term "coil" is intended to refer to a component that may wirelessly output or receive energy for coupling to another "coil." The coil may also be referred to as an "antenna" of a type that is configured to wirelessly output or receive power. The coil 352 may be configured to include an air core or a physical core such as a ferrite core (not shown). Air core loop coils may be more tolerable to extraneous physical devices placed in the vicinity of the core. Furthermore, an air core loop coil 352 allows the placement of other components within the core area. In addition, an air core loop may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another non-limiting example, a capacitor may be placed in parallel between the two terminals of the coil 350. For transmit coils, a signal 358 with a frequency that substantially corresponds to the resonant frequency of the coil 352 may be an input to the coil 352.

In one embodiment, the transmitter 104 may be configured to output a time varying magnetic field with a frequency corresponding to the resonant frequency of the transmit coil 114. When the receiver is within the field 105, the time varying magnetic field may induce a current in the receive coil 118. As described above, if the receive coil 118 is configured to be resonant at the frequency of the transmit coil 114, energy may be efficiently transferred. The AC signal induced in the receive coil 118 may be rectified as described above to produce a DC signal that may be provided to charge or to power a load.

Figure 4:
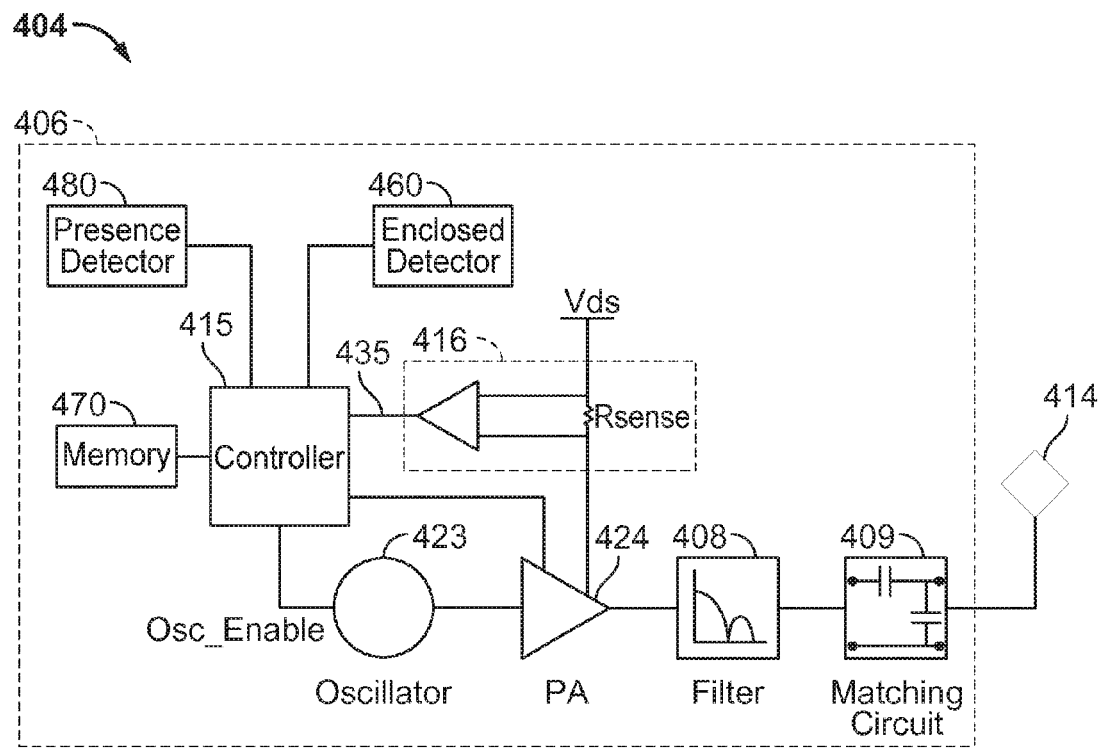
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit coil 414. The transmit coil 414 may be the coil 352 as shown in FIG. 3. Transmit circuitry 406 may provide RF power to the transmit coil 414 by providing an oscillating signal resulting in generation of energy (e.g., magnetic flux) about the transmit coil 414. Transmitter 404 may operate at any suitable frequency. By way of example, transmitter 404 may operate at the 13.56 MHz ISM band.

Transmit circuitry 406 may include a fixed impedance matching circuit 409 for matching the impedance of the transmit circuitry 406 (e.g., 50 ohms) to the transmit coil 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the coil 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit coil 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit coil 414. By way of example, a load sensing circuit 416 monitors the current flowing to the driver circuit 424, that may be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit coil 414 may be implemented with a Litz wire or as an antenna strip with the thickness, width and metal type selected to keep resistive losses low. In a one implementation, the transmit coil 414 may generally be configured for association with a larger structure such as a table, mat, lamp or other less portable configuration. Accordingly, the transmit coil 414 generally may not need "turns" in order to be of a practical dimension. An exemplary implementation of a transmit coil 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit coil 414 may transmit at a specific frequency. In some cases, these regulations are meant to protect humans from electromagnetic radiation. However, there may be environments where a transmit coil 414 is placed in areas not occupied by humans, or occupied infrequently by humans, such as, for example, garages, factory floors, shops, and the like. If these environments are free from humans, it may be permissible to increase the power output of the transmit coil 414 above the normal power restrictions regulations. In other words, the controller 415 may adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive coil that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
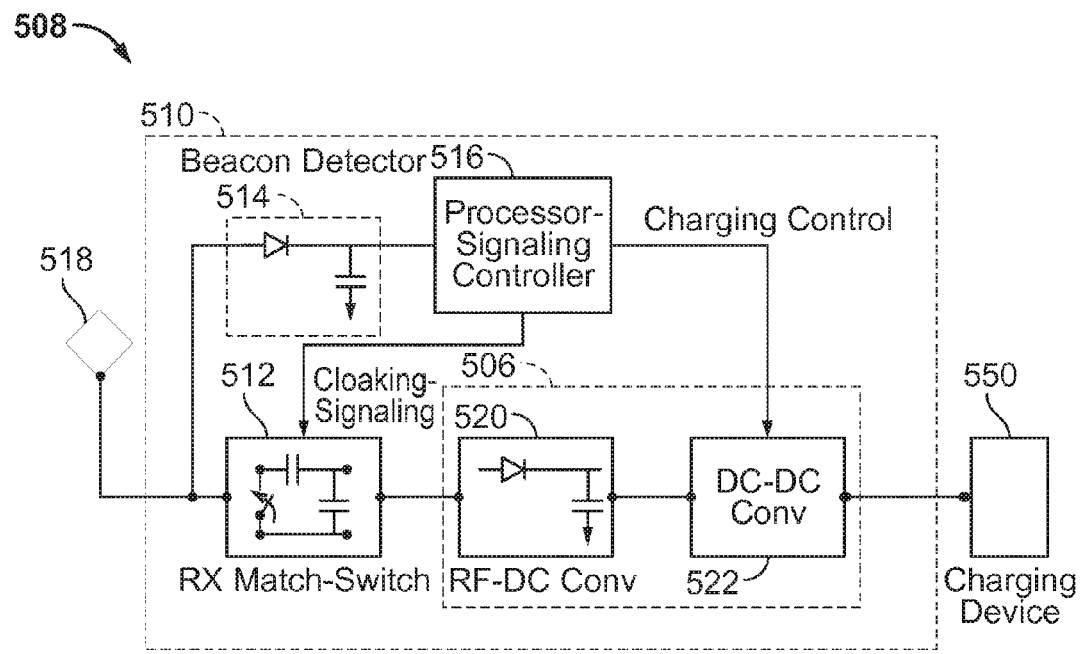
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive coil 518. Receiver 508 further couples to device 550 for providing received power thereto. It should be noted that receiver 508 is illustrated as being external to device 550 but may be integrated into device 550. Energy may be propagated wirelessly to receive coil 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive coil 518 may be tuned to resonate at the same frequency, or within a specified range of frequencies, as transmit coil 414 (FIG. 4). Receive coil 518 may be similarly dimensioned with transmit coil 414 or may be differently sized based upon the dimensions of the associated device 550. By way of example, device 550 may be a portable electronic device having diametric or length dimension smaller that the diameter of length of transmit coil 414. In such an example, receive coil 518 may be implemented as a multi-turn coil in order to reduce the capacitance value of a tuning capacitor (not shown) and increase the receive coil's impedance. By way of example, receive coil 518 may be placed around the substantial circumference of device 550 in order to maximize the coil diameter and reduce the number of loop turns (i.e., windings) of the receive coil 518 and the inter-winding capacitance.

Receive circuitry 510 may provide an impedance match to the receive coil 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive coil 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive coil 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
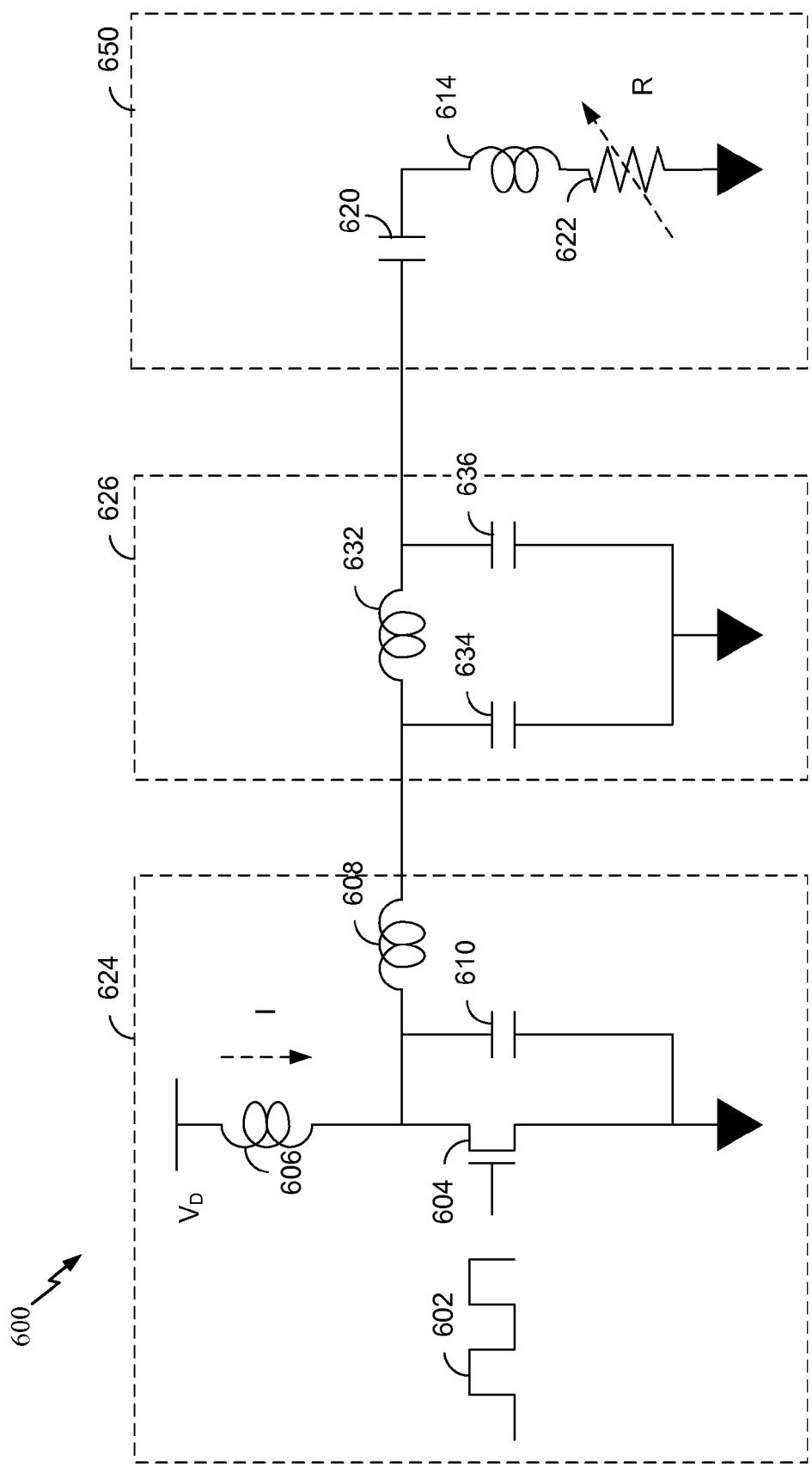
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit

626 may be a three pole (capacitor 634, inductor 632, and capacitor 636) low pass filter circuit 626.

The signal output by the filter circuit 626 may be provided to a transmit circuit 650 comprising a coil 614. The transmit circuit 650 may include a series resonant circuit having a capacitance 620 and inductance (e.g., that may be due to the inductance or capacitance of the coil or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

In various embodiments, the wireless power transmission system 100, described above with respect to FIGS. 1-6, can vary a wireless power transmission based on detection of a nearby object. The nearby object can include an intended receiver, a device to be charged, and/or a foreign object. A foreign object can be something other than an intended transmission target (i.e. a non-charging device) such as, for example, a parasitic receiver, an inorganic object, or a living object (such as a human, animal, etc.). A parasitic receiver can include, for example, a non-electronic metallic object, an unauthorized chargeable device, etc.

For example, as discussed above with respect to FIG. 4, the transmitter 404 can include the presence detector 480, which can detect the presence, distance, orientation, and/or location of the nearby object. In various other embodiments, the presence detector 480 can be located in another location such as, for example, on the receiver 508, or elsewhere. The controller 415 can reduce transmission power when a foreign object is detected within a first distance. In various embodiments, the wireless power transmission system 100 can adjust a characteristic of the wireless power transmission in accordance with rules or regulations regarding biological safety, fire safety, etc. For example, the wireless power transmission system 100 can adjust the transmit power such that the electromagnetic field reaching a nearby human body s below a threshold, given the distance to the human body.

In various embodiments, the presence detector 480 can detect the presence of a nearby object based on a line-of-sight detection mechanism. Line-of-sight detection mechanisms can include for example, infrared detection, ultrasonic detection, laser detection, etc. In embodiments including embedded transmitters, where power may be transmitted through an opaque surface such as a table or desk, it may be preferable to use a non-line-of-sight detection mechanism. Non-line-of-sight mechanisms can include, for example, capacitive detection, radiometric detection, etc.

Figure 7A:
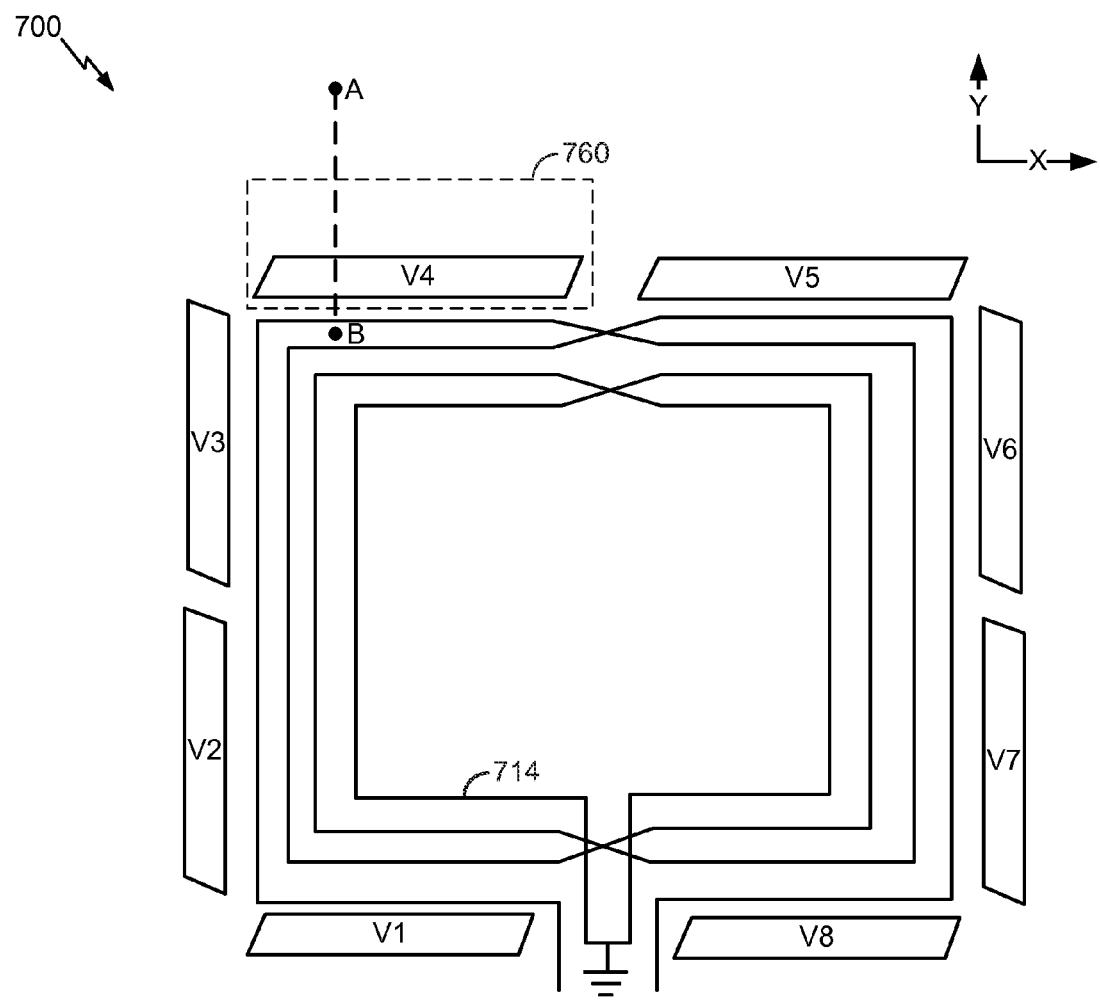
FIG. 7A is a top-view a capacitive presence detection system, in accordance with exemplary embodiments of the invention.

FIG. 7A is a top-view a capacitive presence detection system 700, in accordance with exemplary embodiments of the invention. The capacitive presence detection system 700 can be implemented in conjunction with the wireless power transmission system 100 of FIG. 1. As shown, the capacitive presence detection system 700 includes a transmit coil 714 surrounded by metallic plates V1-V8. In various embodiments, the transmit coil 714 can correspond to any of transmit coils 114, 214, or 414, described above with respect to FIGS. 1, 2, and 4. In an embodiment, the transmit coil 714 can be configured such that an outer portion of the coil carries the most active electrical activity.

The metallic plates V1-V8 can be shaped and oriented so as to create capacitive coupling with a nearby object 760 and/or the transmit coil 714. For example, the metallic plates V1-V8 can be long, wide and thin, having a relatively large surface area. In various embodiments, the metallic plates can include any shape including, for example, L-shaped bends, patterning, and any aspect ratio. In various embodiments, non-metallic materials can be used. The capacitive presence detection system 700 can include any number of metallic plates such as, for example, only one metallic plate. In an embodiment, the transmitter 404 (FIG. 4) may include one or more presence detectors 480 (FIG. 4), each associated with a corresponding metallic plate. As will be discussed below, however, an increased number of metallic plates can increase the ability of the detection system 700 to locate the object 760. In an embodiment, each metallic plate V1-V8 can be tied to ground through a resistor such as, for example, a 10 kΩ resistor.

By measuring changes in the capacitive coupling between one or more metallic plates V1-V8 and the object 760, the capacitive presence detection system 700 can determine one or more of: the presence of the object 760, a distance to the object 760, a location of the object 760, and an orientation of the object 760. The capacitive presence detection system 700 can measure changes in the capacitive coupling between one or more metallic plates V1-V8 and the object 760 directly or indirectly. The details of the capacitive presence detection are described in further detail herein, with respect to FIGS. 9A-B.

Figure 7B:
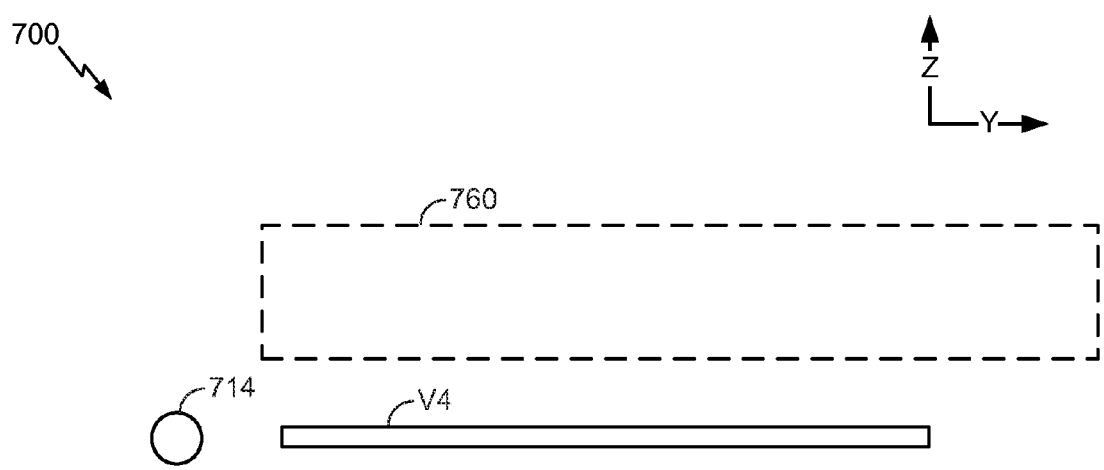
FIG. 7B is a cross-section of the capacitive presence detection system of FIG. 7A, in accordance with exemplary embodiments of the invention.

FIG. 7B is a cross-section of the capacitive presence detection system 700 of FIG. 7A, in accordance with exemplary embodiments of the invention. The cross section of FIG. 7B is taken along the line-segment A-B. As shown in FIG. 7B, the outer portion of the transmit coil 714 has a capacitive coupling with the metallic plate V4. The metallic plate V4 also has a capacitive coupling with the object 760, in embodiments where the object 760 is a conductor. If the object 760 comes closer to the metallic plate V4, the mutual capacitance between the two will increase. If the object 760 moves away from the metallic plate V4, the mutual capacitance between the two will decrease.

Figure 8A:
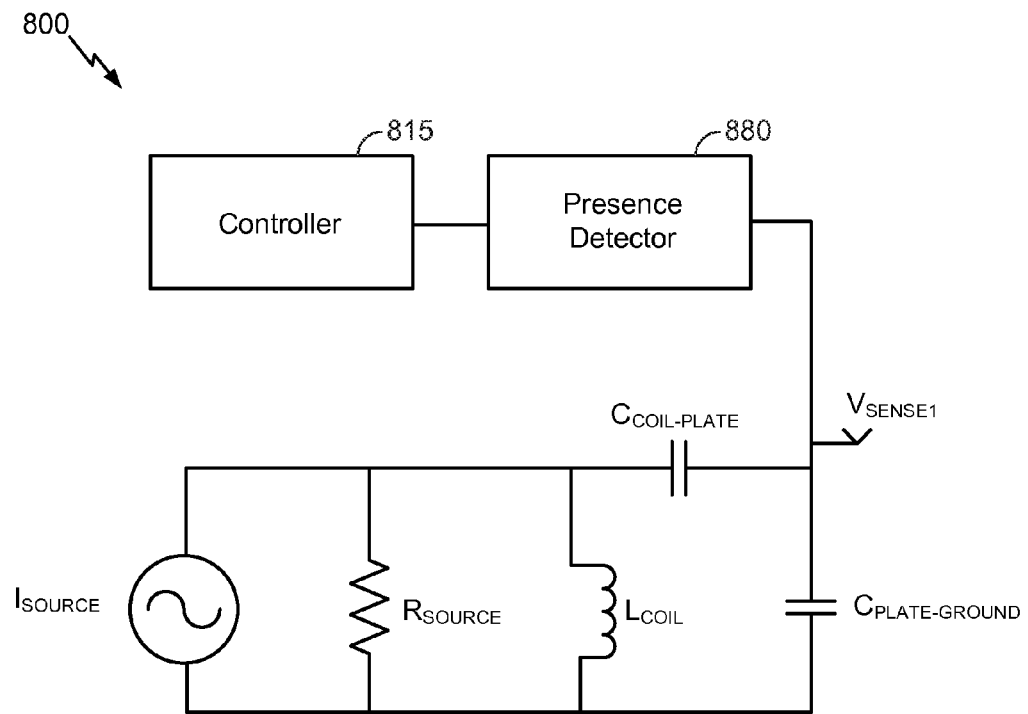
FIG. 8A is a schematic diagram model of the transmitter of FIG. 4, in accordance with exemplary embodiments of the invention.

FIG. 8A is a schematic diagram model 800 of the transmitter 404 of FIG. 4, in accordance with exemplary embodiments of the invention. FIG. 8A models a portion of the transmitter 404 in an embodiment where the object 760 (FIG. 7A) is not near. In other words, the object 760 is not within a distance sufficient to be coupled with any of the metallic plates V1-V8. As shown in FIG. 8A, the model 800 includes a current source $I_{source}$, a resistor $R_{source}$, a transmit coil $L_{coil}$, a capacitor $C_{coil\text{-}plate}$ between the coil and the metallic plate, and a capacitor $C_{plate\text{-}ground}$ between at least one metallic plate V1-V8 and ground. The model 800 further includes a presence detector 880 configured to sample the sense voltage $V_{sense1}$ on at least one of the metallic plates V1-V8, and a controller 815 configured to adjust a characteristic of the transmitter 404 such as, for example, transmit power, transmit frequency, etc. The sense voltage $V_{sense}$ can be the voltage at any point on any of the metallic plates V1-V8. In some embodiments, the sense voltage $V_{sense}$ is measured with respect to ground. In the model 800, the sense voltage $V_{sense1}$, is given by equation 1, below (where ω is the 2π times the operating frequency of the wireless charging system).

$$V_{SENSE1} = \left(\frac{j\omega L_{COIL} R_{SOURCE} I_{SOURCE}}{j\omega L_{COIL} + R_{SOURCE}}\right) * \left(\frac{C_{PLATE\text{-}COIL}}{C_{PLATE\text{-}COIL} + C_{PLATE\text{-}GROUND}}\right) \quad (1)$$

As discussed above with respect to FIG. 7B, when an object 760, such as a person, comes in the proximity of a metallic plate V1-V8 on the wireless transmitter 404, the object 760 adds extra capacitance between the magnetic plate and the ground, in embodiments where the object 760 has a higher dielectric constant than air.

Figure 8B:
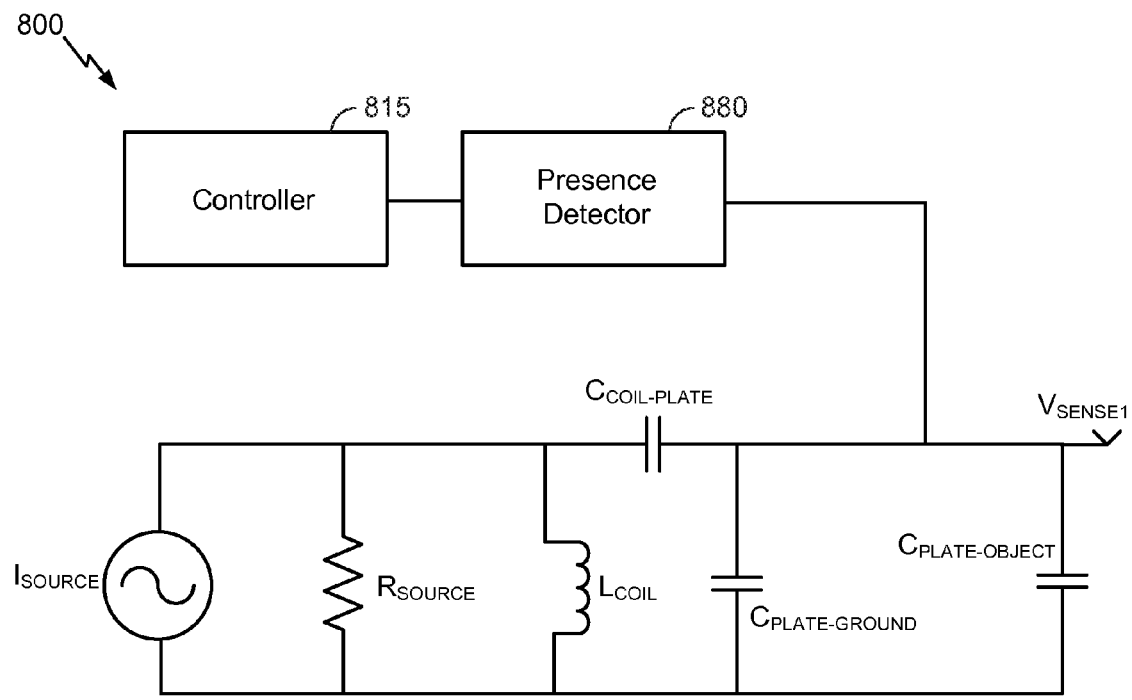
FIG. 8B is the schematic diagram model of FIG. 8A, in accordance with another exemplary embodiment of the invention.

FIG. 8B is the schematic diagram model 800 of FIG. 8A, in accordance with another exemplary embodiment of the invention. FIG. 8B models a portion of the transmitter 404 in an embodiment where the object 760 (FIG. 7A) is near. In other words, the object 760 is within a distance sufficient to be coupled with at least one of the metallic plates V1-V8. As shown in FIG. 8B, the model 800 includes a current source $I_{source}$, a resistor $R_{source}$, a transmit coil $L_{coil}$, a capacitor $C_{coil\text{-}plate}$ between the coil and the metallic plate, a capacitor $C_{plate\text{-}ground}$ between at least one metallic plate V1-V8 and ground, and a capacitor $C_{plate\text{-}object}$ between the object 760 and at least one metallic plate V1-V8. The model 800 further includes the presence detector 880 configured to sample the sense voltage $V_{sense2}$ on at least one of the metallic plates V1-V8, and the controller 815 configured to adjust a characteristic of the transmitter 404 such as, for example, transmit power, transmit frequency, etc. In the model 800, the sense voltage $V_{sense2}$, is given by equation 2, below (where ω is the 2π times the operating frequency of the wireless charging system).

$$V_{SENSE2} = \left(\frac{j\omega L_{COIL} R_{SOURCE} I_{SOURCE}}{j\omega L_{COIL} + R_{SOURCE}}\right) * \left(\frac{C_{PLATE\text{-}COIL}}{C_{PLATE\text{-}COIL} + C_{PLATE\text{-}GROUND} + C_{PLATE\text{-}OBJECT}}\right) \quad (2)$$

In an embodiment, the presence detector 880 can detect the presence of the object 760 based on a change in voltage and/or phase on the $V_{sense}$ node. In an embodiment, the presence detector 880 can be calibrated relative to the sense voltage $V_{sense1}$ when the no object is near, and can compare the sense voltage $V_{sense2}$ to the calibration voltage when the object 760 is near. Likewise, the presence detector 880 can be calibrated relative to the phase of the sense voltage $V_{sense1}$ when the no object is near, and can compare the phase of the sense voltage $V_{sense2}$ to the calibration voltage when the object 760 is near.

As will be described below with respect to FIGS. 9-11, in various embodiments, the presence detector 880 can detect changes in the voltage and/or phase on the $V_{sense}$ node using any of: an analog-to-digital converter (ADC) having a sampling frequency several times faster than the wireless power system frequency, and envelope detector with sample and hold circuit and comparator, and a phase change detector. In other embodiments, capacitive detection methods can be used. For example, the variable capacitance formed by the parallel combination of $C_{plate\text{-}ground}$ and $C_{plate\text{-}object}$ can be configured to set the frequency of an oscillator. Accordingly, the presence detector 880 can identify objects based on changes in the oscillator frequency. In another implementation, the variable capacitance can be used to set the time constant of a first or second order circuit. A person having ordinary skill in the art will appreciate that any other suitable method of directly or indirectly detecting changes to $C_{plate\text{-}object}$ can be used.

As discussed above with respect to FIG. 7A, the presence detection system 700 can include one or more sensors, such as the plurality of metallic plates V1-V8. Each sensor can be connected to a separate presence detector 880. In an embodiment, each sensor/detector pair can individually determine the distance to the object 760 based on the strength of the coupling effect. For example, the coupling between the object 760 and the metallic plate V4 may be much stronger than the coupling between the object 760 and the metallic plate V1.

Accordingly, the presence detection system 700 can compare the detection results associated with the metallic plates V4 and V1 and conclude that the object 760 is near the metallic plate V4. Likewise, the presence detection system 700 can compare the detection results associated with the metallic plates V4 and V5 and conclude that the object 760 is near the metallic plate V4. The sensors can be arranged such that they each react to the presence of the object 760 in a slightly different location.

In an embodiment, the controller 815 (FIG. 8) can use the determined location to control one or more device inputs. For example, the controller 815 can adjust any of the following based on the determined location of the object 760: a charging rate, a music control, a data synchronization, and a power control. In one embodiment, for example, a user can wave a hand over the left side of the presence detection system 700 (i.e., near the metallic plates V2 and V3) in order to pause a music track, and can wave a hand over the right side of the presence detection system 700 (i.e., near the metallic plates V6 and V7) in order to play a music track. Similarly, a user can move a chargeable device to the top of the presence detection system 700 (i.e., near the metallic plates V4 and V5) to increase a charging rate, and move a chargeable device to the bottom of the presence detection system 700 (i.e., near the metallic plates 14 and V8) to decrease a charging rate.

In an embodiment, the controller 815 (FIG. 8) can determine an orientation of the object 760. For example, the object 760 may be shaped such that it is detected at metallic plates V1, V4, V5, and V8 in a first orientation, and at metallic plates V2, V3, V6, and V7 in a second orientation. Accordingly, the controller can use the determined orientation to control one or more device inputs, as discussed above. In one embodiment, for example, a user can rotate the object 760 to the first orientation in order to mute music, and towards a second orientation to increase the volume.

Figure 9:
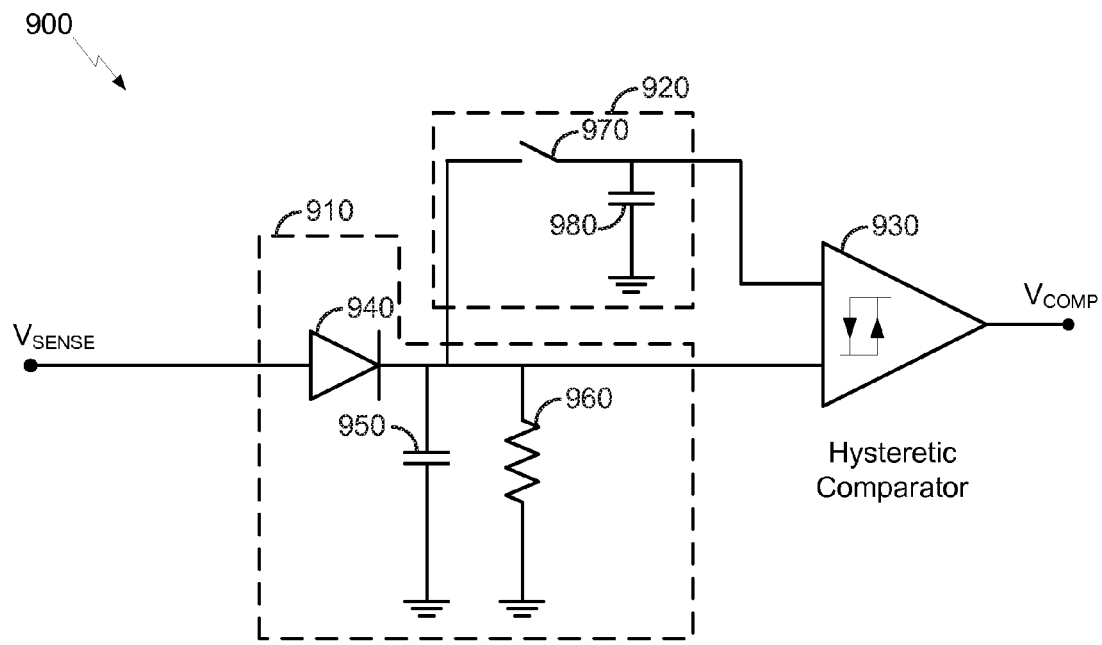
FIG. 9 is a schematic diagram of a presence detector, in accordance with an exemplary embodiment of the invention.

FIG. 9 is a schematic diagram of a presence detector 900, in accordance with an exemplary embodiment of the invention. The presence detector 900 includes an envelope detector 910, a sample and hold circuit 920, and a hysteretic comparator 930. In the illustrated embodiment, the presence detector 900 is configured to receive a calibration input $V_{sense1}$ at a first time, to detect the envelope of the calibration input $V_{sense1}$, and to sample the detected envelope. The presence detector 900 is further configured to receive a second input $V_{sense2}$ at a second time, to detect the envelope of the second input $V_{sense2}$, and compare the calibration input $V_{sense1}$ to the second input $V_{sense2}$, thereby detecting a change in the voltage $V_{sense}$ at one or more metallic plates V1-V8 (FIG. 7A) over time. The presence detector 900 outputs the detected change as a voltage $V_{comp}$.

The envelope detector 910 includes a diode 940, an envelope detection capacitor 950, and a resistor 960. The envelope detector 910 serves to detect the amplitude of the $V_{sense}$ waveform. The sampling circuit 920 includes a switch 970 and a sampling capacitor 980. The sampling circuit 920 serves to sample the detected envelope and to hold the amplitude of the calibration waveform. In an embodiment, the calibration waveform can be sampled when no object is near the transmitter 404 (FIG. 4). The switch 970 can be driven by a clock signal $CLK_{sample}$ (FIG. 10). In an embodiment, the calibration waveform can be periodically or intermittently updated. As discussed above, the controller 815 (FIG. 8) can receive the comparator output $V_{comp}$ and adjust one or more characteristics of the transmitter 404 based on the detected change in voltage at the metallic plates V1-V8.

Figure 10:
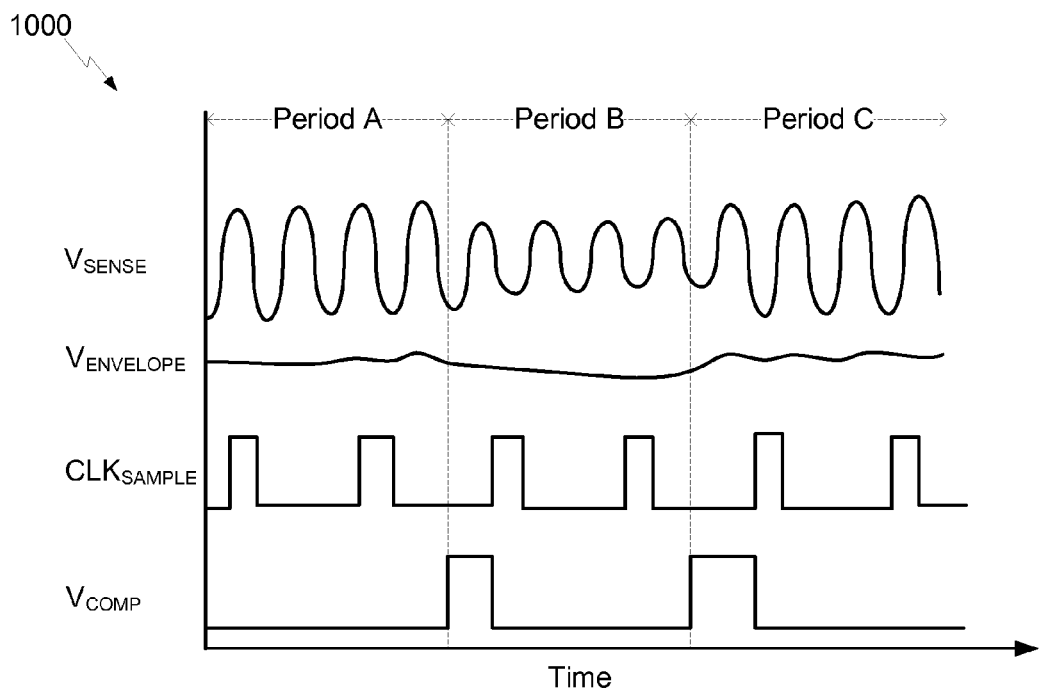
FIG. 10 is a signal plot of nodes in the presence detector of FIG. 9, in accordance with an exemplary embodiment of the invention.

FIG. 10 is a signal plot 1000 of nodes in the presence detector 900 of FIG. 9, in accordance with an exemplary embodiment of the invention. The plot 100 shows three periods A-C, during which $V_{sense}$ changes amplitude. During period A, $V_{sense}$ has a first amplitude, the envelope of which is sampled when $CLK_{sample}$ is high. During period B, $V_{sense}$ changes to a second amplitude. The change is detected by the comparator 930, as shown in the signal $V_{comp}$. Over time, the second amplitude is sampled when $CLK_{sample}$ is high. During period C, $V_{sense}$ changes to a third amplitude. The change is again detected by the comparator 930, and eventually the third amplitude is sampled when $CLK_{sample}$ is high.

Figure 11:
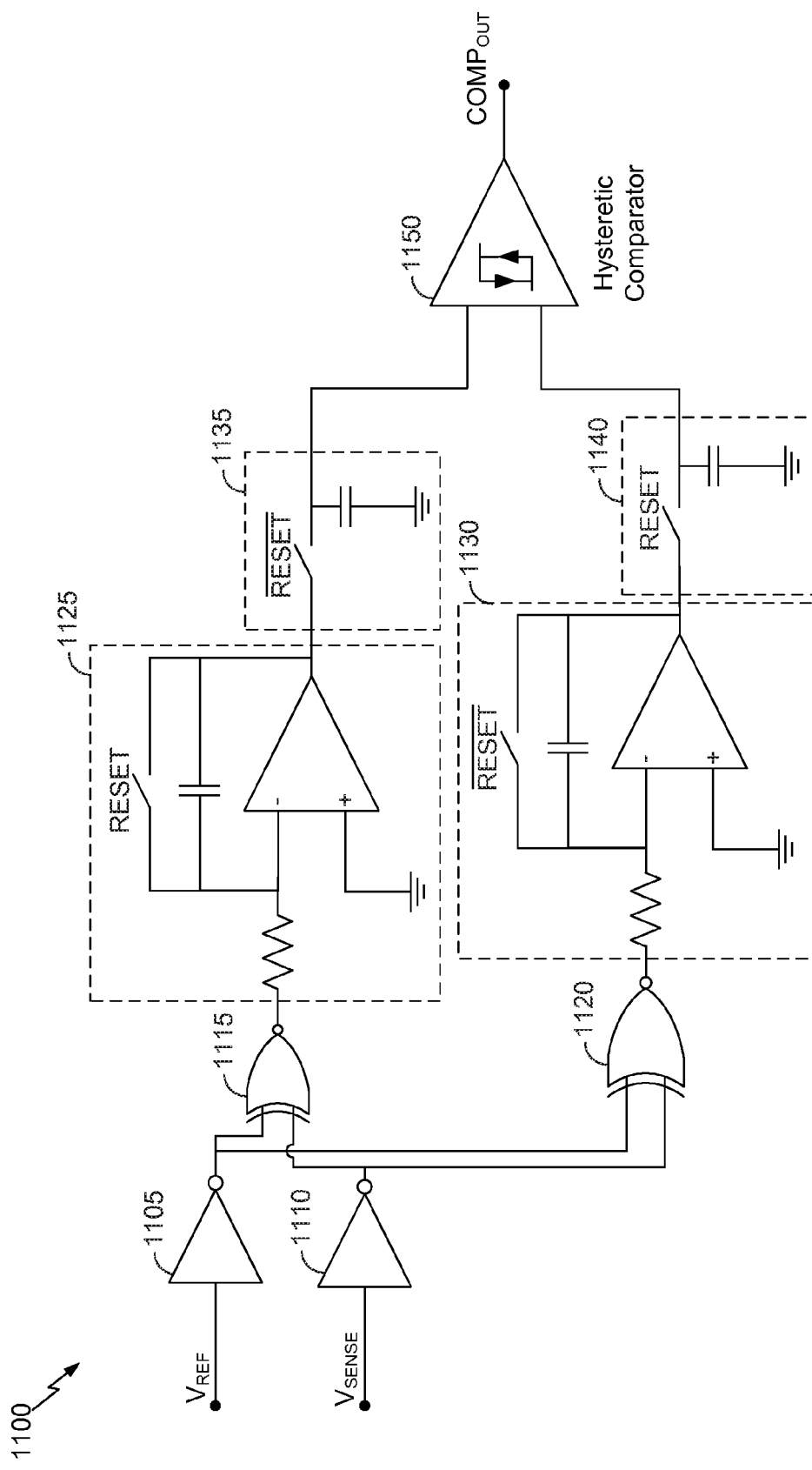
FIG. 11 is a schematic diagram of a presence detector, in accordance with another exemplary embodiment of the invention.

FIG. 11 is a schematic diagram of a presence detector 1100, in accordance with another exemplary embodiment of the invention. The presence detector 1100 includes inverters 1105 and 1110, XNOR gates 920, integrator circuits 1125 and 1130, sample and hold circuits 1135 and 1140, and a hysteretic comparator 1150. In the illustrated embodiment, the presence detector 1100 is configured to detect a phase change in input $V_{sense}$ and output a detection signal $COMP_{out}$.

The inverters 1105 and 1110 serve to square the input waveforms $V_{sense}$ and $V_{ref}$, which can be sinusoidal. $V_{sense}$ can be the voltage at any part of any of the metallic plates V1-V8. The reference waveform $V_{ref}$ can be, for example, the output of the oscillator 423 (FIG. 4) or another reference waveform. The squared waveforms are then XORed at the XNOR gates 1115 and 1120.

The integrator circuits 1125 and 1130 integrate each waveform over half of a square wave cycle, and the results are alternately sampled by the sample and hold circuits 1135 and 1140. In an embodiment, the frequency of the RESET clock is much lower than the frequency of $V_{sense}/V_{ref}$. Accordingly, when the phase of $V_{sense}$ does not change over time, the integrals over the positive and negative phase of the RESET signal will be the same. On the other hand, when the phase of $V_{sense}$ does change, the integrals will be different and the comparator 1150 will signal the difference in the output $COMP_{out}$. As discussed above, the controller 815 (FIG. 8) can receive the comparator output $V_{comp}$ and adjust one or more characteristics of the transmitter 404 based on the detected change in voltage at the metallic plates V1-V8.

Figure 12:
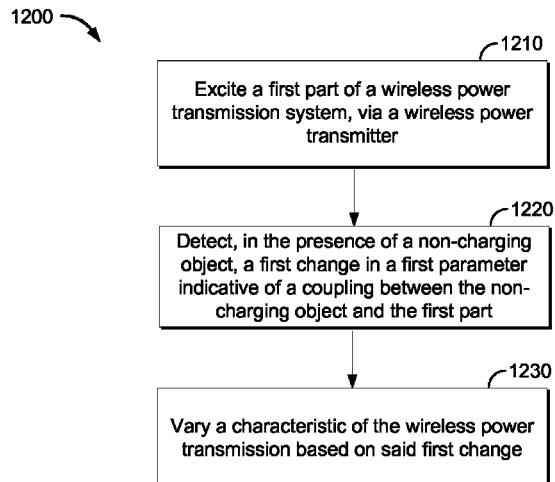
FIG. 12 is a flowchart of an exemplary method of wireless power transmission.

FIG. 12 is a flowchart 1200 of an exemplary method of wireless power transmission. Although the method of flowchart 1200 is described herein with reference to the presence detection system 700 discussed above with respect to FIG. 7A and model 800 discussed above with respect to FIG. 8A, a person having ordinary skill in the art will appreciate that the method of flowchart 1200 may be implemented by another device described herein, or any other suitable device. In an embodiment, the steps in flowchart 1200 may be performed by a processor or controller such as, for example, the controller 415 (FIG. 4), the controller 815 (FIG. 8A), and/or the processor-signaling controller 516 (FIG. 5). Although the method of flowchart 1200 is described herein with reference to a particular order, in various embodiments, blocks herein may be performed in a different order, or omitted, and additional blocks may be added.

First, at block 1210, the transmit coil 714 excites a first part of the wireless power transmission system 100. The first part can be, for example, a conducting plate such as one or more of the metallic plates V1-V8. For example, the metallic plate V1 can be capacitively coupled with the transmit coil 714. Accordingly, changes in the voltage at the transmit coil 714 can excite the metallic plate V1.

Next, at block 1220, the presence detector 880 detects, in the presence of a non-charging object, a first change in a first parameter indicative of a coupling between the non-charging object and the first part. The non-charging object can include something other than an intended transmission target (i.e. a non-charging device) such as, for example, a parasitic receiver, an inorganic object, or a living object (such as a human, animal, etc.). A parasitic receiver can include, for example, a non-electronic metallic object, an unauthorized chargeable device, etc. In an embodiment, the non-charging object can be the object 760.

In an embodiment, the coupling includes a capacitive coupling between the non-charging object and the part. For example, the first parameter can be the amplitude or phase of the voltage $V_{sense}$ on the metallic plate V4. The amplitude or phase of the voltage $V_{sense}$ on the metallic plate V4 can indicate, for example, one or more of: the capacitance $C_{plate-ground}$, the capacitance $C_{plate-object}$, and the capacitance $C_{coil-plate}$.

Then, at block 1230, the controller 815 varies a characteristic of the wireless power transmission based on said first change. In an embodiment, the controller 815 can vary a transmit power at the coil 714. In an embodiment, the controller 415 can decrease or turn off the output at the PA 424 when the change is detected such as, for example, when a living object is close to the transmitter. Likewise, the controller 415 can increase or turn on the output at the PA 424 when another change is detected such as, for example, when a living object is no longer close to the transmitter. In another embodiment, the controller 815 can adjust the transmit frequency at the coil 714.

Figure 13:
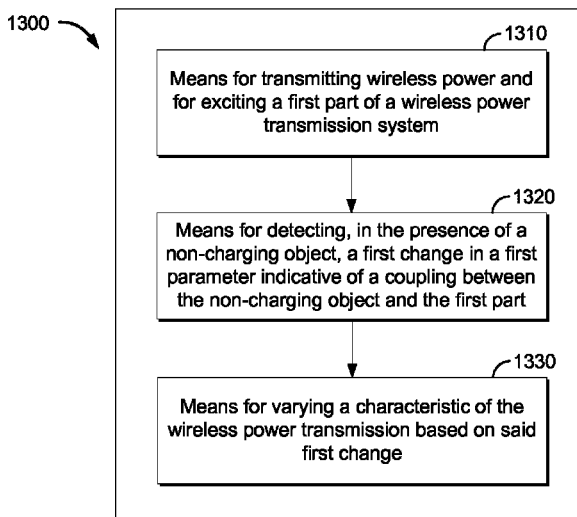
FIG. 13 is a functional block diagram of a system for wireless power transmission 1300, in accordance with an exemplary embodiment of the invention.

FIG. 13 is a functional block diagram of a system for wireless power transmission 1300, in accordance with an exemplary embodiment of the invention. The system for wireless power transmission 1300 comprises means 1310 for transmitting wireless power and for exciting a first part of a wireless power transmission system, means 1320 for detecting, in the presence of a non-charging object, a first change in a first parameter indicative of a coupling between the non-charging object and the first part, and means 1330 for varying a characteristic of the wireless power transmission based on said first change.

In an embodiment, the means 1310 for transmitting wireless power and for exciting a first part of a wireless power transmission system can be configured to perform one or more of the functions described above with respect to block 1210 (FIG. 12). In various embodiments, the means 1310 for transmitting wireless power and for exciting a first part of a wireless power transmission system can be implemented by one or more of the transmitter 114 (FIG. 1), the transmit coil 214 (FIG. 2), the transmit coil 414 (FIG. 4), the transmit coil 614 (FIG. 6), and the transmit coil 714 (FIG. 7).

In an embodiment, the means 1320 for detecting, in the presence of a non-charging object, a first change in a first parameter indicative of a coupling between the non-charging object and the first part can be configured to perform one or more of the functions described above with respect to block 1220 (FIG. 12). In various embodiments, the means 1320 for detecting, in the presence of a non-charging object, a first change in a first parameter indicative of a coupling between the non-charging object and the first part can be implemented by one or more of the presence detector 480 (FIG. 4), the presence detector 880 (FIG. 8), the controller 415 (FIG. 4), the controller 815 (FIG. 8), and the metallic plates V1-V8 (FIG. 7).

The means 1330 for varying a characteristic of the wireless power transmission based on said first change can be configured to perform one or more of the functions described above with respect to block 1230. In various embodiments, the means 1330 for varying a characteristic of the wireless power transmission based on said first change can be implemented by a processor or controller such as, for example, the controller 415 (FIG. 4), the controller 815 (FIG. 8), and/or the processor-signaling controller 516 (FIG. 5).

Figure 14:
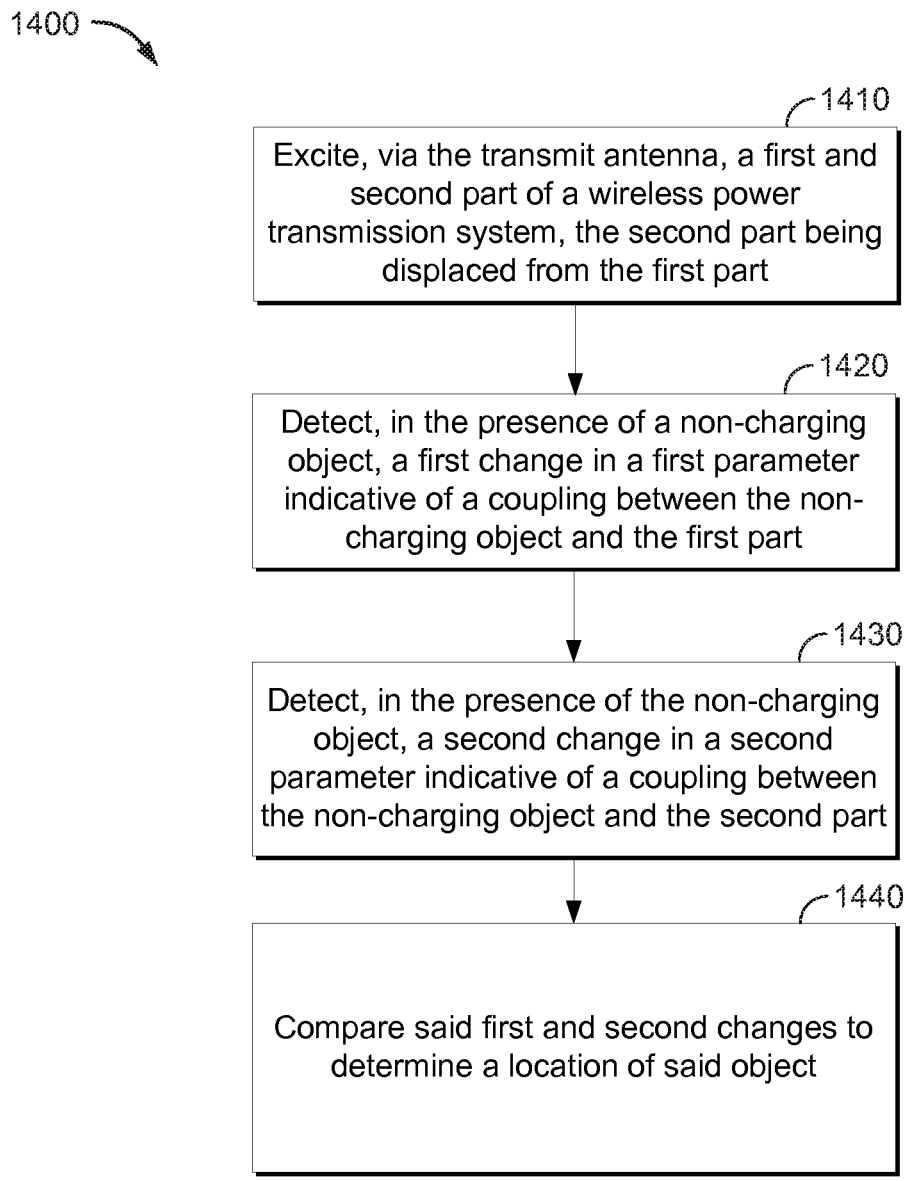
FIG. 14 is a flowchart of an exemplary method of wireless power transmission.

FIG. 14 is a flowchart 1400 of an exemplary method of wireless power transmission. Although the method of flowchart 1400 is described herein with reference to the presence detection system 700 discussed above with respect to FIG. 7A and model 800 discussed above with respect to FIG. 8A, a person having ordinary skill in the art will appreciate that the method of flowchart 1400 may be implemented by another device described herein, or any other suitable device. In an embodiment, the steps in flowchart 1400 may be performed by a processor or controller such as, for example, the controller 415 (FIG. 4), the controller 815 (FIG. 8A), and/or the processor-signaling controller 516 (FIG. 5). Although the method of flowchart 1400 is described herein with reference to a particular order, in various embodiments, blocks herein may be performed in a different order, or omitted, and additional blocks may be added.

First, at block 1410, the transmit coil 714 excites a first and second part of the wireless power transmission system 100. The first and second parts can each be, for example, a conducting plate such as one or more of the metallic plates V1-V8. For example, the metallic plate V1 can be capacitively coupled with the transmit coil 714. Accordingly, changes in the voltage at the transmit coil 714 can excite the metallic plate V1. Likewise, the metallic plate V2 can be capacitively coupled with the transmit coil 714. Accordingly, changes in the voltage at the transmit coil 714 can excite the metallic plate V1.

Next, at block 1420, the presence detector 880 detects, in the presence of a non-charging object, a first change in a first parameter indicative of a coupling between the non-charging object and the first part. The non-charging object can include something other than an intended transmission target (i.e. a non-charging device) such as, for example, a parasitic receiver, an inorganic object, or a living object (such as a human, animal, etc.). A parasitic receiver can include, for example, a non-electronic metallic object, an unauthorized chargeable device, etc. In an embodiment, the non-charging object can be the object 760.

In an embodiment, the coupling includes a capacitive coupling between the non-charging object and the first part. For example, the first parameter can be the amplitude or phase of the voltage $V_{sense}$ on the metallic plate V4. The amplitude or phase of the voltage $V_{sense}$ on the metallic plate V4 can indicate, for example, one or more of: the capacitance $C_{plate-ground}$, the capacitance $C_{plate-object}$, and the capacitance $C_{coil-plate}$ for the plate V4.

Then, at block 1430, the presence detector 880 (or another presence detector not shown) detects, in the presence of a non-charging object, a second change in a second parameter indicative of a coupling between the non-charging object and the second part. The non-charging object can include something other than an intended transmission target (i.e. a non-charging device) such as, for example, a parasitic receiver, an inorganic object, or a living object (such as a human, animal, etc.). A parasitic receiver can include, for example, a non-electronic metallic object, an unauthorized chargeable device, etc. In an embodiment, the non-charging object can be the object 760.

In an embodiment, the coupling includes a capacitive coupling between the non-charging object and the second part. For example, the second parameter can be the amplitude or phase of the voltage $V_{sense}$ on the metallic plate V1. The amplitude or phase of the voltage $V_{sense}$ on the metallic plate V1 can indicate, for example, one or more of: the capacitance $C_{plate-ground}$, the capacitance $C_{plate-object}$, and the capacitance $C_{coil-plate}$ for the plate V1.

Thereafter, at block 1440, the controller 815 compares said first and second changes to determine a location of said object. In an embodiment, the controller 815 can receive the detection signals from two or more different presence detectors 880, and can compare them in order to determine a distance to, location of, and/or orientation of the object. In an embodiment, the controller 815 can vary a transmit power at the coil 714 based on the determined distance, location, or orientation. In an embodiment, the controller 415 can decrease or turn off the output at the PA 424, for example, when a living object is within a threshold distance to the transmitter. Likewise, the controller 415 can increase or turn on the output at the PA 424, for example, when a living object is not within a threshold distance to the transmitter. In another embodiment, the controller 815 can adjust the transmit frequency at the coil 714.

Figure 15:
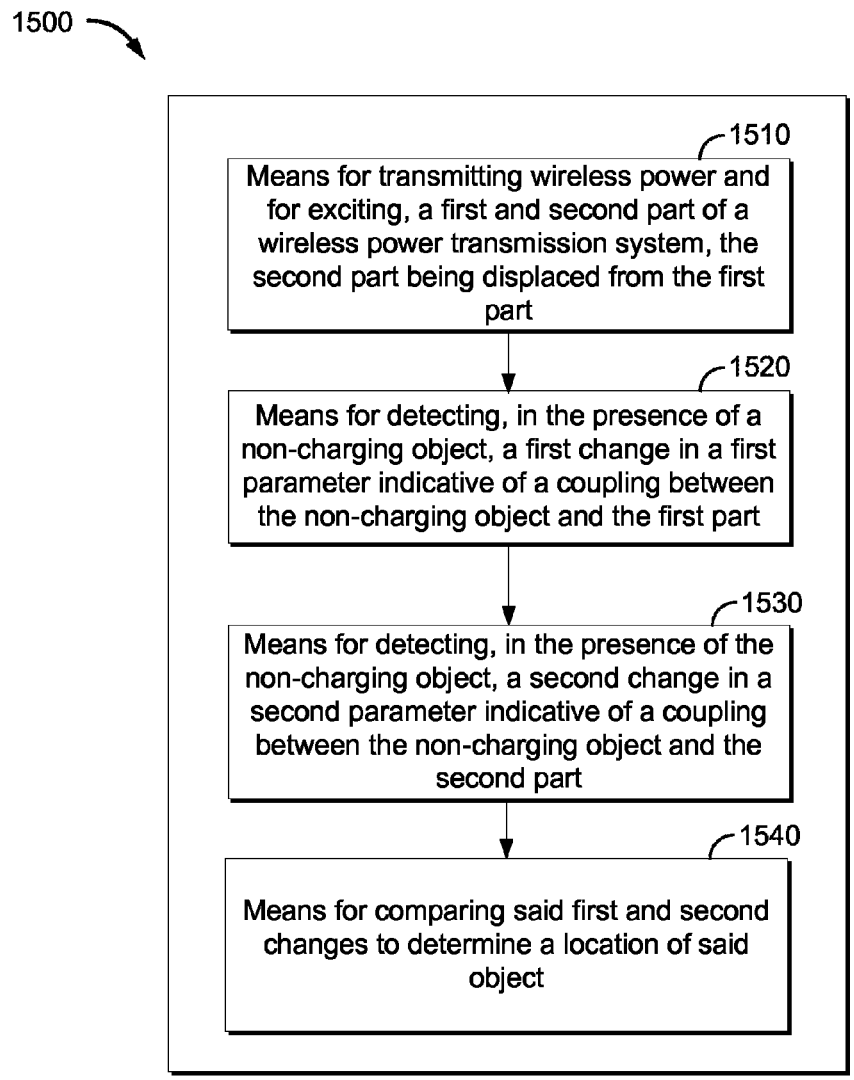
FIG. 15 is a functional block diagram of a system for wireless power transmission, in accordance with an exemplary embodiment of the invention.

In an embodiment, the controller 815 can adjust a device input based on the distance, location, or orientation of the object 760. For example, the controller 815 can adjust one or more of a charging rate, a music control, a data synchronization, and a power control. In various embodiments, the controller 815 can adjust the device input via a wired or wireless communication link FIG. 15 is a functional block diagram of a system for wireless power transmission 1500, in accordance with an exemplary embodiment of the invention. The system for wireless power transmission 1500 comprises means 1510 for transmitting wireless power and for exciting, a first and second part of a wireless power transmission system, the second part being displaced from the first part, means 1520 for detecting, in the presence of a non-charging object, a first change in a first parameter indicative of a coupling between the non-charging object and the first part, means 1530 for detecting, in the presence of the non-charging object, a second change in a second parameter indicative of a coupling between the non-charging object and the second part, and means 1540 for comparing said first and second changes to determine a location of said object.

In an embodiment, the means 1510 for transmitting wireless power and for exciting, a first and second part of a wireless power transmission system, the second part being displaced from the first part can be configured to perform one or more of the functions described above with respect to block 1210 (FIG. 12). In various embodiments, the means 1510 for transmitting wireless power and for exciting, a first and second part of a wireless power transmission system, the second part being displaced from the first part can be implemented by one or more of the transmitter 114 (FIG. 1), the transmit coil 214 (FIG. 2), the transmit coil 414 (FIG. 4), the transmit coil 614 (FIG. 6), and the transmit coil 714 (FIG. 7).

In an embodiment, the means 1520 for detecting, in the presence of a non-charging object, a first change in a first parameter indicative of a coupling between the non-charging object and the first part can be configured to perform one or more of the functions described above with respect to block 1420 (FIG. 14). In various embodiments, the means 1520 for detecting, in the presence of a non-charging object, a first change in a first parameter indicative of a coupling between the non-charging object and the first part can be implemented by one or more of the presence detector 480 (FIG. 4), the presence detector 880 (FIG. 8), the controller 415 (FIG. 4), the controller 815 (FIG. 8), and the metallic plates V1-V8 (FIG. 7).

The means 1530 for detecting, in the presence of the non-charging object, a second change in a second parameter indicative of a coupling between the non-charging object and the second part can be configured to perform one or more of the functions described above with respect to block 1430 (FIG. 14). In various embodiments, the means 1530 for detecting, in the presence of the non-charging object, a second change in a second parameter indicative of a coupling between the non-charging object and the second part can be implemented by one or more of the presence detector 480 (FIG. 4), the presence detector 880 (FIG. 8), the controller 415 (FIG. 4), the controller 815 (FIG. 8), and the metallic plates V1-V8 (FIG. 7).

The means 1540 for comparing said first and second changes to determine a location of said object can be configured to perform one or more of the functions described above with respect to block 1440. In various embodiments, the means 1540 for comparing said first and second changes to determine a location of said object can be implemented by a processor or controller such as, for example, the controller 415 (FIG. 4), the controller 815 (FIG. 8), and/or the processor-signaling controller 516 (FIG. 5).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of wireless power transmission comprising:
   exciting a first part of a wireless power transmission system, via a wireless power transmitter;
   detecting, in the presence of a non-charging object, a first change in a first parameter indicative of a capacitive coupling between the non-charging object and the first part; and
   varying a characteristic of the wireless power transmission based on said first change.

2. The method of claim 1, wherein the wireless power transmitter excites the first part via an antenna capacitively coupled with the first part.

3. The method of claim 1, wherein the first part comprises a conducting plate.

4. The method of claim 3, wherein the conducting plate comprises a metal.

5. The method of claim 1, wherein the non-charging object comprises a living object.

6. The method of claim 1, wherein the non-charging object comprises a parasitic receiver.

7. The method of claim 1, wherein the varied characteristic of the wireless power transmission comprises a transmit power.

8. The method of claim 7, wherein said varying comprises reducing the transmit power when the first change is detected.

9. The method of claim 7, wherein said varying comprises increasing the transmit power when the first change is detected.

10. The method of claim 1, wherein the varied characteristic of the wireless power transmission comprises a transmit frequency.

11. A method of determining a distance of an object from a transmit antenna comprising:
   exciting, via the transmit antenna, a first and second part of a wireless power transmission system, the second part being displaced from the first part;
   detecting, in the presence of a non-charging object, a first change in a first parameter indicative of a coupling between the non-charging object and the first part;
   detecting, in the presence of the non-charging object, a second change in a second parameter indicative of a coupling between the non-charging object and the second part; and
   comparing said first and second changes to determine a location of said object.

12. The method of claim 11, wherein the coupling comprises a capacitive coupling.

13. The method of claim 11, wherein the first and second parts each comprise a conducting plate.

14. The method of claim 13, wherein each conducting plate comprises a metal.

15. The method of claim 11, wherein the non-charging object comprises a living object.

16. The method of claim 11, wherein the non-charging object comprises a parasitic receiver.

17. The method of claim 11, further comprising varying a characteristic of the wireless power transmission based on the determined location of said object.

18. The method of claim 17, wherein the varied characteristic of the wireless power transmission comprises a transmit power.

19. The method of claim 18, wherein said varying comprises reducing the transmit power based on the determined location.

20. The method of claim 18, wherein said varying comprises increasing the transmit power based on the determined location.

21. The method of claim 17, wherein the varied characteristic of the wireless power transmission comprises a transmit frequency.

22. The method of claim 11, further comprising controlling a device input based on the determined location.

23. The method of claim 22, wherein the device input comprises at least one of: a charging rate, a music control, a data synchronization, and a power control.

24. The method of claim 11, further comprising determining an orientation of the object.

25. A system configured to provide wireless power transmission comprising:
   a first metal plate;
   a transmit antenna configured to provide wireless power and to excite the first metal plate; and
   a circuit configured to detect a first change in capacitance between said transmit antenna and said first metal plate.

26. The system of claim 25, further comprising a controller configured to vary a characteristic of the wireless power transmission based on the detected first change.

27. The system of claim 26, wherein the varied characteristic of the wireless power transmission comprises a transmit power.

28. The system of claim 27, wherein said varying comprises reducing the transmit power when the first change is detected.

29. The system of claim 27, wherein said varying comprises increasing the transmit power when the first change is detected.

30. The system of claim 26, wherein the varied characteristic of the wireless power transmission comprises a transmit frequency.

31. A system configured to determine a location of a foreign object in a vicinity of a wireless charging system comprising:
   a first metal plate;
   a second metal plate displaced from the first metal plate;
   a transmit antenna configured to provide wireless power and to excite the first and second metal plates;
   a circuit configured to detect a first change in capacitance between said transmit antenna and said first metal plate;
   a circuit configured to detect a second change in capacitance between said transmit antenna and said second metal plate; and
   a circuit configured to compare said first change to said second change to determine the location of said foreign object.

32. The system of claim 31, further comprising a controller configured to vary a characteristic of the wireless power transmission based on the determined location of said object.

33. The system of claim 32, wherein the varied characteristic of the wireless power transmission comprises a transmit power.

34. The system of claim 33, wherein said varying comprises reducing the transmit power based on the determined location.

35. The system of claim 33, wherein said varying comprises increasing the transmit power based on the determined location.

36. The system of claim 32, wherein the varied characteristic of the wireless power transmission comprises a transmit frequency.

37. The system of claim 31, further comprising a controller configured to control a device input based on the determined location.

38. The system of claim 37, wherein the device input comprises at least one of: a charging rate, a music control, a data synchronization, and a power control.

39. The system of claim 31, further comprising a circuit configured to determine an orientation of the object.

40. An apparatus for wireless power transmission comprising:
   means for transmitting wireless power and for exciting a first part of a wireless power transmission system;
   means for detecting, in the presence of a non-charging object, a first change in a first parameter indicative of a capacitive coupling between the non-charging object and the first part; and
   means for varying a characteristic of the wireless power transmission based on said first change.

41. The apparatus of claim 40, wherein the means for transmitting excites the first part via an antenna capacitively coupled with the first part.

42. The apparatus of claim 40, wherein the first part comprises a conducting plate.

43. The apparatus of claim 42, wherein the conducting plate comprises a metal.

44. The apparatus of claim 40, wherein the non-charging object comprises a living object.

45. The apparatus of claim 40, wherein the non-charging object comprises a parasitic receiver.

46. The apparatus of claim 40, wherein the varied characteristic of the wireless power transmission comprises a transmit power.

47. The apparatus of claim 46, further comprising means for reducing the transmit power when the first change is detected.

48. The apparatus of claim 46, further comprising means for increasing the transmit power when the first change is detected.

49. The apparatus of claim 40, wherein the varied characteristic of the wireless power transmission comprises a transmit frequency.

50. An apparatus for determining a distance of an object from a transmit antenna comprising:
    means for transmitting wireless power and for exciting a first and second part of a wireless power transmission system, the second part being displaced from the first part;
    means for detecting, in the presence of a non-charging object, a first change in a first parameter indicative of a coupling between the non-charging object and the first part;
    means for detecting, in the presence of the non-charging object, a second change in a second parameter indicative of a coupling between the non-charging object and the second part; and
    means for comparing said first and second changes to determine a location of said object.

51. The apparatus of claim 50, wherein the coupling comprises a capacitive coupling.

52. The apparatus of claim 50, wherein the first and second parts each comprise a conducting plate.

53. The apparatus of claim 52, wherein each conducting plate comprises a metal.

54. The apparatus of claim 50, wherein the non-charging object comprises a living object.

55. The apparatus of claim 50, wherein the non-charging object comprises a parasitic receiver.

56. The apparatus of claim 50, further comprising means for varying a characteristic of the wireless power transmission based on the determined location of said object.

57. The apparatus of claim 56, wherein the varied characteristic of the wireless power transmission comprises a transmit power.

58. The apparatus of claim 57, further comprising means for reducing the transmit power based on the determined location.

59. The apparatus of claim 57, further comprising means for increasing the transmit power based on the determined location.

60. The apparatus of claim 56, wherein the varied characteristic of the wireless power transmission comprises a transmit frequency.

61. The apparatus of claim 50, further comprising means for controlling a device input based on the determined location.

62. The apparatus of claim 61, wherein the device input comprises at least one of: a charging rate, a music control, a data synchronization, and a power control.

63. The apparatus of claim 50, further comprising means for determining an orientation of the object.

64. A non-transitory computer-readable medium comprising code that, when executed, causes an apparatus to:
    excite a first part of a wireless power transmission system, via a wireless power transmitter;
    detect, in the presence of a non-charging object, a first change in a first parameter indicative of a coupling between the non-charging object and the first part; and
    vary a characteristic of the wireless power transmission based on said first change.

65. The medium of claim 64, wherein the coupling comprises a capacitive coupling.

66. The medium of claim 64, wherein the first part comprises a conducting plate.

67. The medium of claim 66, wherein the conducting plate comprises a metal.

68. The medium of claim 64, wherein the non-charging object comprises a living object.

69. The medium of claim 64, wherein the non-charging object comprises a parasitic receiver.

70. The medium of claim 64, wherein the varied characteristic of the wireless power transmission comprises a transmit power.

71. The medium of claim 70, further comprising code that, when executed, causes the apparatus to reduce the transmit power when the first change is detected.

72. The medium of claim 70, further comprising code that, when executed, causes the apparatus to increase the transmit power when the first change is detected.

73. The medium of claim 64, wherein the varied characteristic of the wireless power transmission comprises a transmit frequency.

74. A non-transitory computer-readable medium comprising code that, when executed, causes an apparatus to:
    excite, via a transmit antenna, a first and second part of a wireless power transmission system, the second part being displaced from the first part;
    detect, in the presence of a non-charging object, a first change in a first parameter indicative of a coupling between the non-charging object and the first part;
    detect, in the presence of the non-charging object, a second change in a second parameter indicative of a coupling between the non-charging object and the second part; and
    compare said first and second changes to determine a location of said object.

75. The medium of claim 74, wherein the coupling comprises a capacitive coupling.

76. The medium of claim 74, wherein the first and second parts each comprise a conducting plate.

77. The medium of claim 76, wherein each conducting plate comprises a metal.

78. The medium of claim 74, wherein the non-charging object comprises a living object.

79. The medium of claim 74, wherein the non-charging object comprises a parasitic receiver.

80. The medium of claim 74, further comprising code that, when executed, causes the apparatus to vary a characteristic of the wireless power transmission based on the determined location of said object.

81. The medium of claim 80, wherein the varied characteristic of the wireless power transmission comprises a transmit power.

82. The medium of claim 81, further comprising code that, when executed, causes the apparatus to reduce the transmit power based on the determined location.

83. The medium of claim 81, further comprising code that, when executed, causes the apparatus to increase the transmit power based on the determined location.

84. The medium of claim 80, wherein the varied characteristic of the wireless power transmission comprises a transmit frequency.

85. The medium of claim 74, further comprising code that, when executed, causes the apparatus to control a device input based on the determined location.

86. The medium of claim 85, wherein the device input comprises at least one of: a charging rate, a music control, a data synchronization, and a power control.

87. The medium of claim 74, further comprising code that, when executed, causes the apparatus to determine an orientation of the object.

* * * * *